March 4, 1958  C W. MUSSER ET AL  2,825,140
GAUGE FOR MEASURING BARREL SHAPE OF COMPRESSION SPECIMENS
Filed Sept. 21, 1955  2 Sheets-Sheet 1

INVENTORS
C WALTON MUSSER
LLOYD W. INSETTA
BY
W. E. Thibodeau, A. W. Dew
and H. J. Forman ATTORNEYS March 4, 1958 — C W. MUSSER ET AL — 2,825,140
GAUGE FOR MEASURING BARREL SHAPE OF COMPRESSION SPECIMENS
Filed Sept. 21, 1955 — 2 Sheets-Sheet 2

INVENTORS
C WALTON MUSSER
LLOYD W. INSETTA
BY W. E. Thibodeau, A. W. Dew
and H. I. Forman
ATTORNEYS

United States Patent Office 2,825,140
Patented Mar. 4, 1958

2,825,140

GAUGE FOR MEASURING BARREL SHAPE OF COMPRESSION SPECIMENS

C Walton Musser, Levittown, and Lloyd W. Insetta, Feasterville, Pa., assignors to the United States of America as represented by the Secretary of the Army Application September 21, 1955, Serial No. 535,768

2 Claims. (Cl. 33—174)

(Granted under Title 35, U. S. Code (1952), sec. 266)

The invention described herein may be manufactured and used by or for the Government for governmental purposes without the payment of any royalty thereon.

This invention relates to measurement of plastic deformation in materials. More particularly, the invention is directed to measurement of the lateral strain produced in cylindrical specimens of material by stress applied at their bases.

A preferred prior art device for measuring such lateral strain comprehends optical means and is termed a comparator. Thereby, a specimen's enlarged, shadow image is projected upon a reticulated screen. In this device the specimen is positioned with the aid of a lump of clay upon a transparent support adapted for micrometric displacement along right angular axes in the same plane. Thus, dimensions of a specimen, at selected reference points, are determined in terms of shadow edge coincidences with reticulation, and readings by micrometer of corresponding displacements of the support. Some undesirable aspects of this kind of device are: high cost; cumbersome apparatus; dependence on visual acuity and judgment of an operator; requirement of extensive operator training to attain reliable results; and undependable positioning of the specimen.

Accordingly, it is an object of our invention to provide a materially less expensive means for carrying out measurements of the kind in question.

Another object is to provide a compact system.

Still another object is to reduce the operator-error and extensive-training factors.

A further object is to provide dependable positioning of the specimen.

We have accomplished the foregoing objects by devising means whereby a specimen may be reliably clamped at its bases and translated micrometrically between micrometric, detecting calipers that contact and respond automatically to the lateral configuration of the specimen at opposite points of tangency in a plane normal to its axis.

A structure fulfilling the objects of the invention is described with reference to the accompanying drawings in which.

Figure 1:
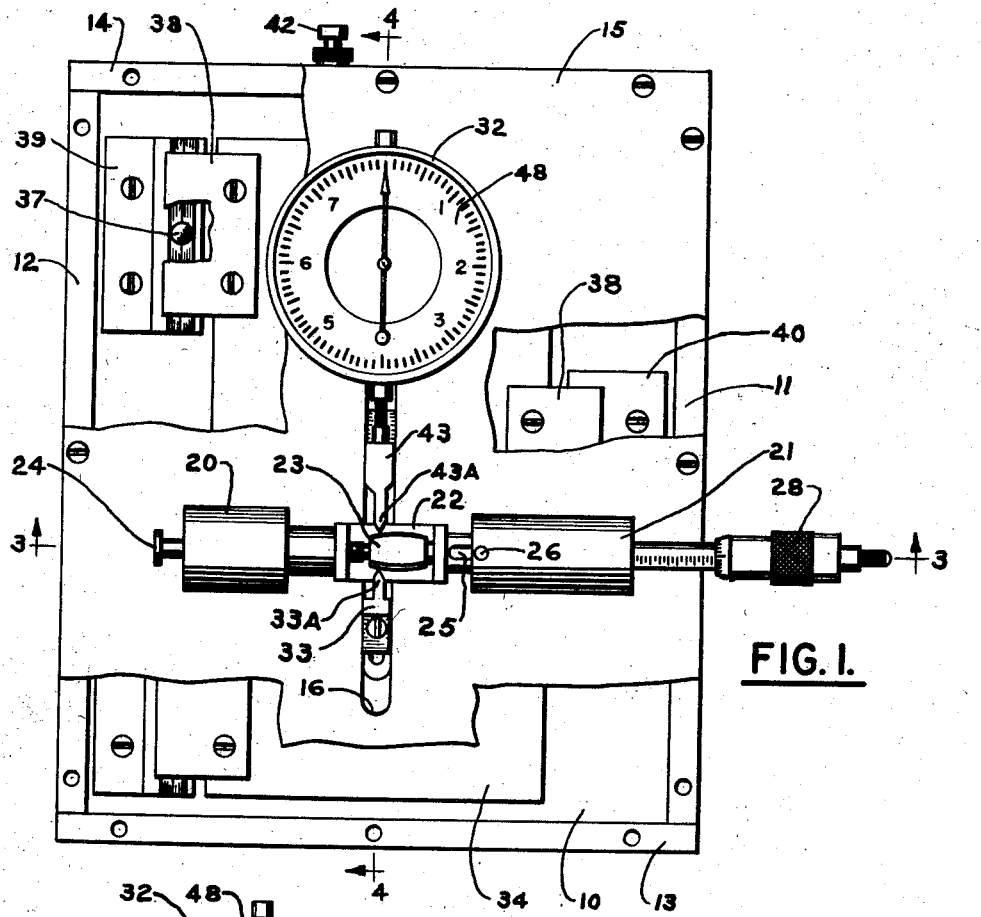
Figure 1 is a plan view of the entire structure illustrating a specimen in a position for commencement of its measurement, and partly broken away to reveal elements of an underlying suspension system for the detecting calipers.

Reverting now to Figure 1, the illustrated embodiment comprises a rectangular reference base or housing composed of a bottom plate 10, side plates 11 and 12, front and rear plates 13 and 14, and a top plate 15.

Figure 4:
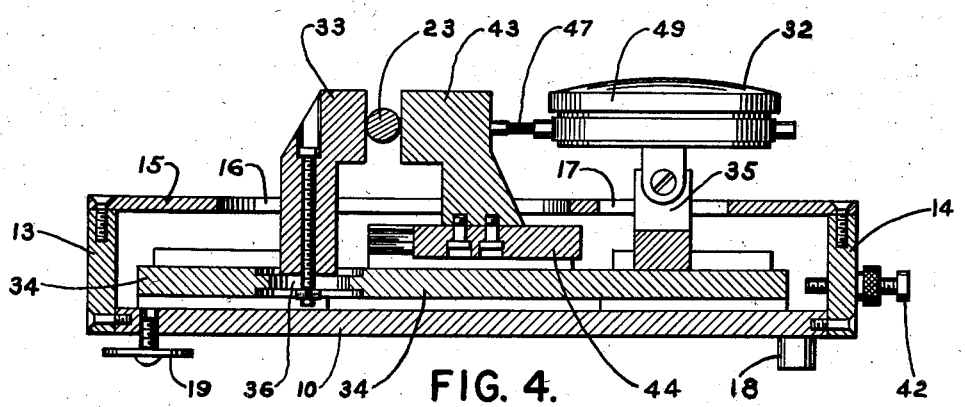
Figure 4 is a longitudinal section, taken along line 4—4 of Figure 1, certain elements being shown in elevation and omitting features unnecessary to this view.

Top plate 15 is slotted as at 16 in Fig. 1 and at 17 in Figure 4 to adapt therethrough and for reciprocation therein structures supported from within the housing.

Figure 3:
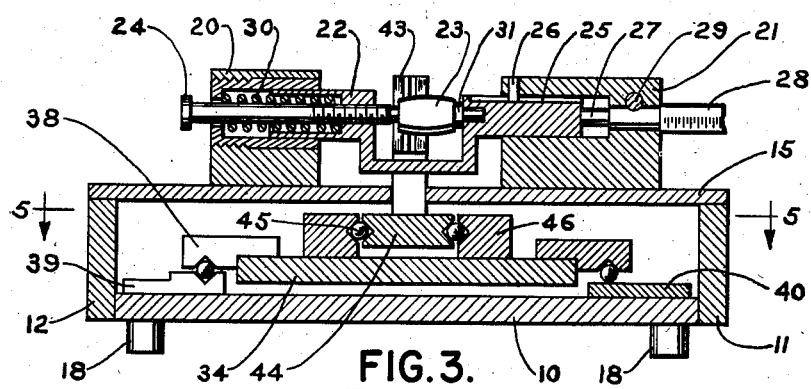
Figure 3 is a transverse section, taken along line 3—3 in Figure 1, certain elements being shown in elevation and omitting a feature unnecessary to this view.

Bottom plate 10 is supported at three points, as in Figures 3 and 4, on pads 18 and levelling screw 19.

Figure 2:
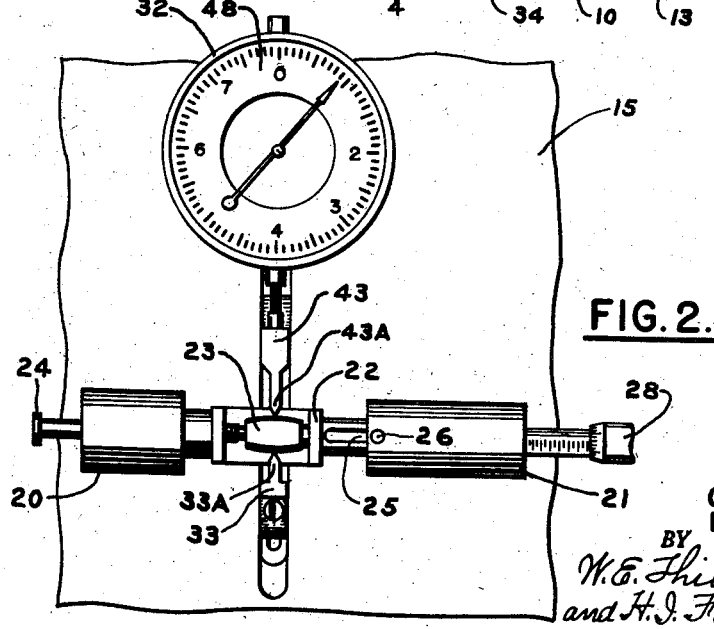
Figure 2 is a central segment of Figure 1 depicting a specimen having been translated approximately half way through the detecting calipers.

In Figures 1 and 2, a frame holder 20 and a micrometer block 21 are secured to top plate 15 for cooperative support of a bridging frame 22 in which a specimen 23 may be clamped by screw 24.

In further detail in Figure 3, frame holder 20 and micrometer block 21 are adapted to support frame 22 slidably. That end of bridging frame 22 which is supported in micrometer block 21 is slotted as at 25. A dowel 26 is inserted through micrometer block 21 and engaged within slot 25 for confining the frame to translational movement responsive to spindle 27 of a micrometer 28 secured within micrometer block 21 by tapered pin 29. The opposite end of frame 22 is hollowed to accommodate a frame return spring 30 whereby the frame 22 is made responsive to both extension and retraction of the micrometer spindle 27. The specimen-clamping screw 24 passes freely through frame holder 20 and threadedly through frame 22. A precision ground anvil 31 is inserted within frame 22 for accurate positioning of the specimen. In summary, the structure detailed in this paragraph is exemplary of means for reliably clamping a specimen at its bases and translating such specimen reciprocatively, along its axis. When it is desired to provide for a rotation of the clamped specimen about its axis, while so clamped, for measurement circumferentially, either continuously or at variously selected opposite points of tangency, at selected stations of translation, the specimen clamping screw 24 may be equipped with a rotative tip and the specimen clamping anvil 31 is mounted in frame 22 rotatively.

In Figures 1 and 4, a dial gauge or indicating means 32 and a fixed jaw 33 are fastened to a bridging slide plate 34 respectively on bracket 35 and through aperture 36 in the slide plate. The aperture 36 is elongated to provide for selected values of fixed spacing between the dial gauge and the fixed jaw for adaptation to specimens of varying size in an anticipated range.

Figure 5:
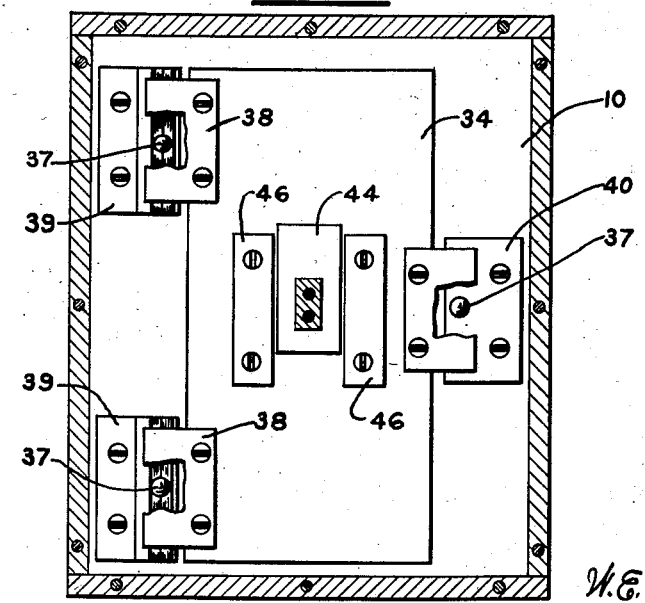
Figure 5 is a plan section along the line 5—5 in Figure 3.

In Figure 5, the slide plate 34 is mounted for rectilinear displacement at right angles to the specimen clamping and translating means on ball bearings 37 through the agency of top rails 38, bottom rails 39 and bearing pad 40. The ball bearings are confined under the top rails by means of dowel pins, not illustrated. The V configuration of bearing races in the top and bottom rails, as illustrated in Figures 3 and 5, precludes lateral displacement of slide plate 34, while the plain bearing pad 40 precludes misalignment of the slide plate and consequent binding.

The structure described in the preceding paragraph therefore provides for a mounting of the dial gauge 32 and the fixed jaw 33 for rectilinear displacement in fixed relation to one another and with a very low order of frictional resistance to such displacement. The levelling screw 19, previously described, is used to level the apparatus for relieving the slide plate from the influence of gravitational components.

In Figure 4, a slide plate stop 42 is provided for locking the slide plate against movement during transport, and to facilitate clamping of a specimen as will appear later.

A movable jaw 43, illustrated in plan in Figures 1 and 2 and in sectional detail in Figure 4, as fastened to a slide 44. This slide is supported on ball bearings 45 between guides 46 affixed to slide plate 34. The ball bearings are confined to the slide by dowel pins, not illustrated. The slide therefore provides for a mounting of the movable jaw for rectilinear displacement parallel with but independently of the slide plate by virtue of a very low order of frictional resistance. A spindle 47 of dial gauge 32, Figure 4, is spring loaded and urges the movable jaw into contact with the specimen. The spring loading of the dial gauge spindle is not illustrated. The same force operates to draw the fixed jaw 33 into contact with the specimen.

The rectilinearly, freely-moving bridging slide plate 34, with fixed jaw 33 and spring-loaded dial gauge 32 affixed thereto, and slide 44 carrying movable jaw 43 in rectilinearly, independently moving relation with the slide plate exemplify detecting and indicating caliper means that contact and respond accurately to the lateral configuration of the specimen and reflect, micrometrically, changes in dimension with progressive translation of a specimen therebetween.

Jaws 33 and 43 are knife-edged at their point of contact with the specimen as illustrated in Figures 1, 2 and 3 at 33A and 43A.

The dial gauge 32 is possessed of a circular scale 48 that is affixed to its upper, outer rim 49 which is in frictional relation with the body of the gauge. Thus, the scale may be set at zero with respect to the hand of the gauge, after a specimen has been embraced at an extremity for commencement of measurement, so as to directly indicate variation in cross-section of a specimen as it is being translated between the detecting caliper means.

The mode of use of our instrument is as follows: Since the only force used to operate the calipering jaws 43 and 33 is the spring pressure from gauge 32, it is desirable that the device be first leveled by use of screw 19 so that the only force necessary for the spring to overcome is the friction forces in the bearings 45. Because the jaws of the calipers 33, 43, are urged by the dial gauge spindle 47 into closed relation when no specimen is interposed, they must be manually separated for insertion of a specimen into the bridging frame 22 for clamping. For this step it is convenient to move aside from frame 22 the fixed jaw 33 and to lock the slide plate 34, carrying the fixed jaw, against movement by fully screwing in slide plate stop 42. This leaves the user free to pull aside the movable jaw 43 with his right hand and to position a specimen against the anvil 31 for clamping. The movable jaw 43 is then released gently against the specimen, freeing the right hand for clamping the specimen with screw 24. Thereupon, the slide plate stop 42 is unscrewed to free slide plate 34 for response to spring loaded spindle 47 which urges the dial gauge 32 away from the movable jaw 43 resting against the specimen, and consequently draws the fixed jaw 33 into contact with the specimen through the agency of the slide plate 34. By means of micrometer 28 the specimen is then translated into a first reference position and the reading on the micrometer recorded. The dial gauge 32 is set at zero by appropriate rotation of rim 49. Thereafter, the specimen is progressively translated between the calipering jaws in increments of choice and the respective values in cross-sectional dimensions of the specimen are found indicated upon the dial gauge.

From the foregoing description it is evident that our invention provides a simplified, more nearly accurate, compact, direct-reading means whereby a specimen of the kind described may be reliably clamped at its bases and translated micrometrically and reciprocatively, and simultaneously calipered micrometrically to determine accurately the lateral configuration of the specimen and at the same time accurately measuring the position to which the lateral reading is made without predetermining the position where the readings are to be taken obtaining the results more rapidly than as heretofore been done. The structure shown and described herein is exemplary and accordingly should be considered illustrative, not limitative.

As shown in the drawings Figs. 1, 2, 3, and 4, the knife edged jaws 43 and 33 have a length at least equal to the diameter of the workpiece 23 in order that these jaws may accurately gauge the diameter of the work regardless of whether it be centered transversely with respect to the work holding jaws. Greater approach to accuracy is made possible by the knife edged jaws being of this length for the purpose stated. Another factor contributing to the high degree of accuracy is the fact that the knife edged jaws are closed solely by the influence of the light spring customarily present in gauges or indicators of the type discussed. Great speed with accuracy is obtainable in the measuring operation due to the elimination of the need for drilling the previously used centering holes in the ends of the work. Another factor contributing to the rapidity of the operation is the fact that the work is quickly clamped between the flat work holding jaws.

We claim:

1. A device for measuring the transverse distortion of a generally cylindrical piece of work having non-uniform diameters comprising a base, two opposed longitudinal work holding jaws having flat square ends to cooperate with flat square ends of a work piece to eliminate centering of the work piece, a first bridging connection between said work holding jaws one of said work holding jaws being fixed with respect to said bridging connection, the second work holding jaw, being adjustable with respect to said bridging connection, a stationary support on said base at each end of said bridging connection slidably supporting said connection, a micrometer screw on said base with its spindle in contact with said bridging connection for moving said bridging connection with respect to said stationary support, a spring cooperating with said stationary support and said bridging member, said spring pressing said bridging connection against said micrometer screw, an adjusting means between the adjustable work holding jaw and said bridging connection whereby said adjustable jaw may be withdrawn or advanced toward said fixed jaw for removal or insertion of a workpiece therebetween, a pair of opposed calipering jaws, a dial indicator gauge having a plunger and a light spring pressing said plunger against a first one of said calipering jaws, a second bridging member between said dial indicator gauge and the second one of said calipering jaws, said first calipering jaw being mounted on said second bridging member for movement toward and from said second calipering jaw, said second bridging member being movable transversely to the motion of the first bridging member, upstanding knife edges longer than the diameter of a work piece and carried by said calipering jaws whereby said calipering jaws correctly indicate the diameter of the work irrespective of being accurately centered in said work holding jaws, said light spring pressure not being sufficient to cause said knife edges to indent a work piece, said micrometer screw being adapted to longitudinally translate a work piece transversely with respect to said calipering jaws, said first-mentioned calipering jaw being movable with respect to and in the same plane with said second calipering jaw such that the pressure of said light spring against said plunger causes the first-mentioned calipering jaw to contact a work piece and the same light spring causes said second bridging member to move in the opposite direction such that both calipering jaws are always in contact with a work piece, the longitudinal position of said calipering jaws being readable on said micrometer screw and at the same position said dial indicator gauge reading indicates the diameter of the work piece.

2. The device of claim 1 wherein the adjustable work holding jaw may be rotated to shift the work circumferentially to determine the diameter of the work piece, at several positions on the circumference, the second bridging member being mounted on anti-friction bearings, and the first calipering jaw mounted thereon with anti-friction bearings to allow for a low order of frictional resistance in the movement of the calipering jaws.

References Cited in the file of this patent

UNITED STATES PATENTS

| | | |
|---|---|---|
| 1,622,342 | Prather | Mar. 29, 1927 |
| 2,309,142 | Stafford | Jan. 26, 1943 |
| 2,370,220 | Aller | Feb. 27, 1945 |
| 2,381,276 | Greenleaf | Aug. 7, 1945 |
| 2,409,924 | Bauer | Oct. 22, 1946 |
| 2,470,004 | Trame | May 10, 1949 |
| 2,497,199 | Aller | Feb. 14, 1950 |
| 2,714,765 | Creek | Aug. 9, 1955 |
| 2,748,489 | Meilstrup | June 5, 1956 |
| 2,763,934 | Creek | Sept. 25, 1956 |

FOREIGN PATENTS

| | | |
|---|---|---|
| 394,821 | Great Britain | July 6, 1933 |
| 580,188 | Great Britain | Aug. 29, 1946 |